United States Patent [19]

Solano et al.

[11] Patent Number: 4,854,426
[45] Date of Patent: Aug. 8, 1989

[54] HANDBRAKE COMPENSATOR FOR MOTOR VEHICLES

[75] Inventors: Victorino Solano; Antonio Trilla, both of Barcelona, Spain

[73] Assignee: Pujol Y Tarrago S.A., Rubi, Spain

[21] Appl. No.: 209,857

[22] Filed: Jun. 22, 1988

[30] Foreign Application Priority Data

Jul. 10, 1987 [ES] Spain ................................. 8702034

[51] Int. Cl.⁴ ........................................... F16D 65/44
[52] U.S. Cl. ........................... 188/196 M; 74/501.5 R
[58] Field of Search ............ 188/24.19, 196 M, 196 B, 188/196 V, 204 R; 74/501.5 R, 502.4, 502.5, 502.6, 516, 522, 525

[56] References Cited

U.S. PATENT DOCUMENTS 2,249,220  7/1941  McCann ...................... 188/196 M
3,333,660  8/1967  Swift .............................. 188/196 B
4,235,046  11/1980  Hess et al. ...................... 74/501.5 X Primary Examiner—Duane A. Reger
Attorney, Agent, or Firm—Michael J. Striker

[57] ABSTRACT

A handbrake compensator for a motor vehicle includes a support having a tubular body receiving a spring and two opposing flanges. The support is connected to a load distributor element which transmits load from a primary cable to a secondary cable connected to a wheel. The load distributor element has two opposing wings provided with elongated slots which receive a cap screw which connects the load distributor element to the support. One of the slots has toothed edges so that the screw can be moved axially of the support to adjust the position of the load distributor element relative to the spring to thereby adjust tension of the cables.

12 Claims, 2 Drawing Sheets

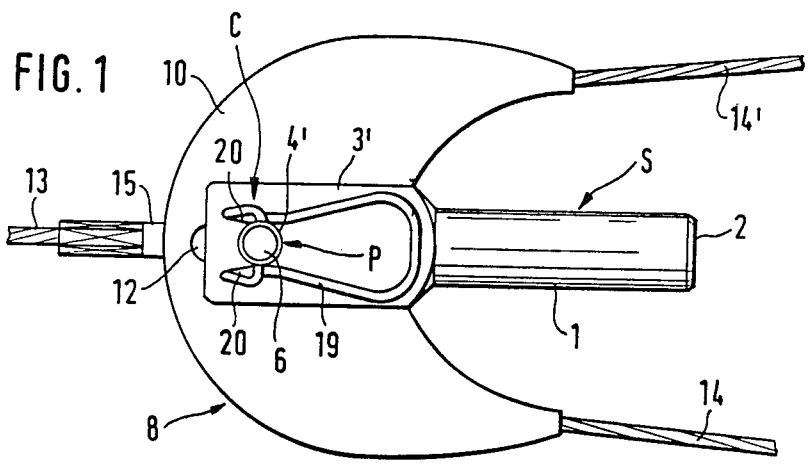
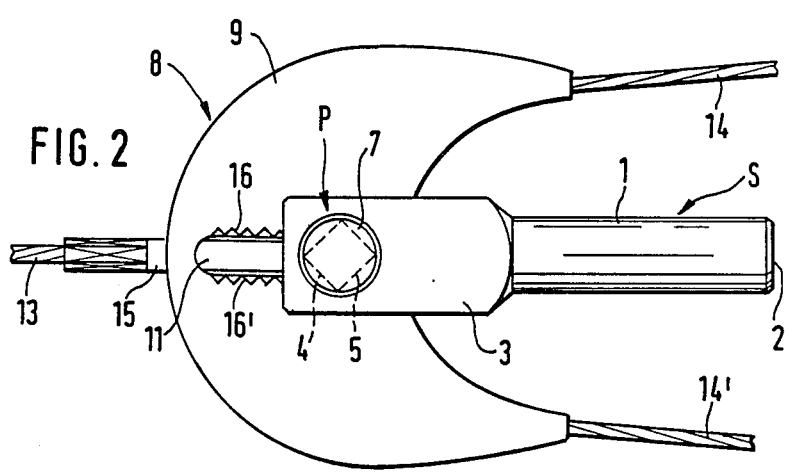
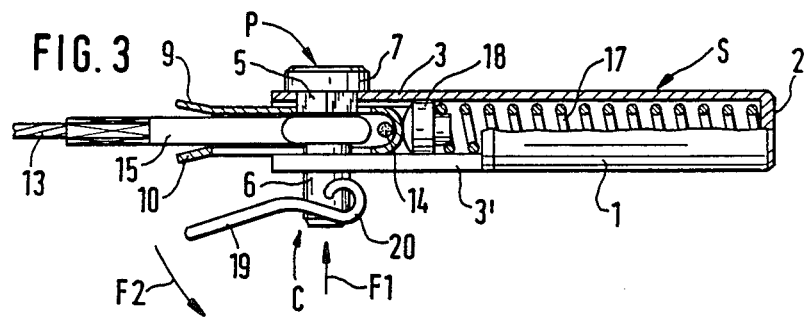

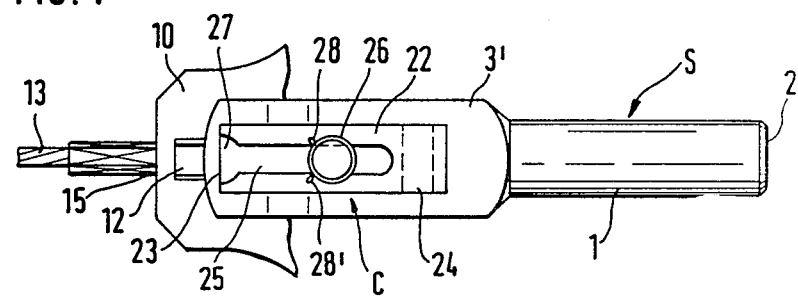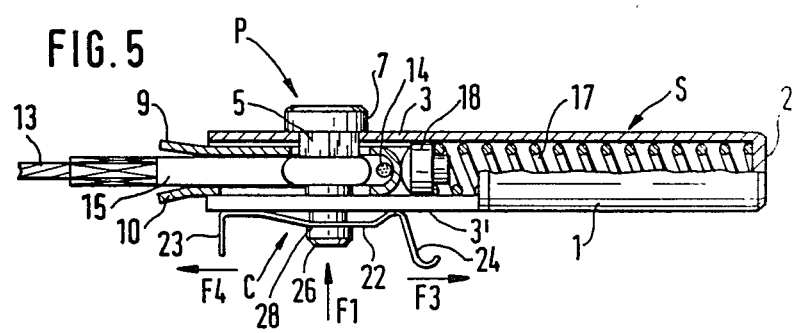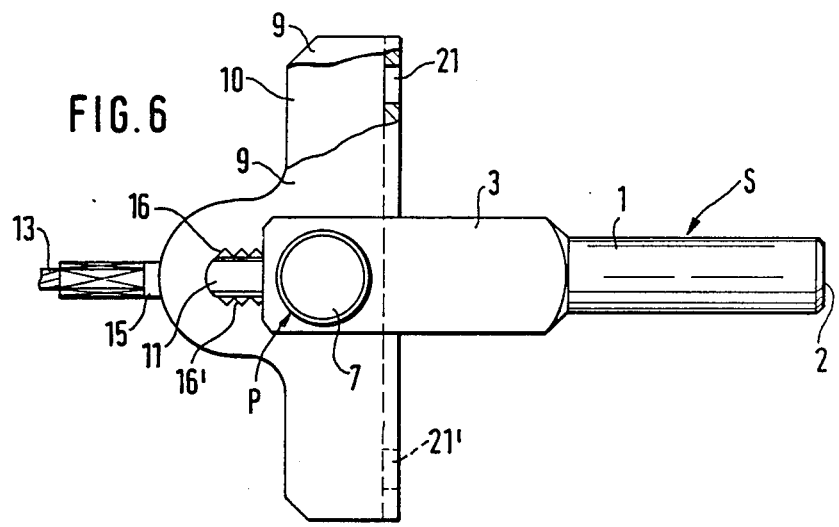

HANDBRAKE COMPENSATOR FOR MOTOR VEHICLES

BACKGROUND OF THE INVENTION

The present invention relates to a handbrake compensator for braking devices on the wheels to be used in modern motor vehicles as a safety device.

Handbrake compensators used as safety devices in motor vehicles are known. Special conditions of the assembly process on the lines of the large motor manufacturing works require a considerable time to adjust a prior tension of the handbrake cable which connects the handle of the brake with the rear wheel brake. At the present time, such adjustment is a manual operation, and the operator must check the cable tension in each motor vehicle in order to adjust the length of either the cable or the sheath by rotating a small specific tension adjusting mechanism by a greater or lesser number of turns until a predetermined tension is obtained.

Since the tension adjustment elements of the handbrake are located under the automobile chassis and very close to the sheet metal and despite the fact that the vehicle body being assembled is moved upwards, the adjustment operation is uncomfortable and requires from the operator carrying it out a great degree of attention. Furthermore, the amount of the adjustment to be made is variable within wide limits and has no specific law of correlation, which requires even more attention to be paid to the adjusting operation.

SUMMARY OF THE INVENTION

It is an object of the present invention to provide an improved handbrake compensator.

It is another object of the invention to provide a handbrake compensator easily mountable in the motor vehicle.

Yet another object of the invention is to provide a handbrake compensator which is easy and economical to manufacture and assemble and which is self-adjustable to the extent of providing the cables with a predetermined desired tension with an admissible tolerance.

These and other objects of the invention are attained by a handbrake compensator for motor vehicles, comprising support means having an axis of elongation and including a substantially tubular body closed at one end thereof and including at an opposite end two parallel flanges; load distributor means including two superimposed parallel wings positioned between said flanges; spring means accommodated in said tubular body and being maintained in a compressed position against said load distributor means; a cap screw extending through said flanges and said wings; a primary cable having a terminal inserted in said load distributor means; at least one secondary cable connected to said load distributor means, said screw holding said terminal of said primary cable in the handbrake compensator; and closing and retaining means provided on said cap screw, said wings each including an elongated slot through which said cap screw passes, one of said slots having two opposite toothed edges extended along said axis of elongation and adapted to snugly receive a portion of said cap screw, said cap screw being insertable into said one slot in an initial position in which said load distributor means applies against said spring means a predetermined force to compress said spring means, said cap screw being removable from said one slot by pushing said cap screw so as to change a position of said load distributor means along said axis and thus adjust a tension of said primary cable relative to said secondary cable by a residual force of said spring means, said cap screw being reinsertable into said one slot between said toothed edges in a new adjusted position in which said cap screw is retained by said closing and retaining means.

The small number of components parts of the brake compensator is significantly important for obtaining an effective, reliable, low cost and long lasting device. At the same time the installation of the brake compensator in an automobile is simple and speedy, without requiring any particular specialization of the operator to carry it out appropriately.

Said elongated slots may be centrally positioned in said respective wings.

The terminal of the primary cable may have an opening through which said cap passes to hold said terminal with a ability to pivot.

The flanges may be provided with bores receiving said cap screw, said portion of said cap screw being a neck of a square cross-section, one of said bores having a square cross-section to snugly receive said neck, said neck being also engaged in said adjusted position between flanks of two pairs of consecutive teeth of said toothed edges of said one slot so that in said adjusted position said support means and said load distributor means are firmly held together.

Said one of said bores has a diagonal which may coincide in direction with said axis of elongation.

It will be understood that the rigidity of the assembly is important to ensure interchangeability in use and operation of the handbrake after the installation of the compensator according to the invention in the vehicle.

The wings of said load distributor means may have arc-shaped surfaces, an arc-shaped surface of each wing forming a channel at an inner side.

In another embodiment, the load distributor means encloses a straight channel and has a bottom portion formed with two bores which receive ends of secondary cables.

In both embodiments the elongated slots are formed in the central portions of parallel wings.

The election of one or another embodiment of the load distributor means is determined by the need of adaptation to the fact that certain types of automobiles are provided with handbrakes having two secondary cables located between the brake mechanism of each wheel and the primary cable, whereas other types of vehicles are equipped with a single cable the free ends of which are attached to the brake mechanism of each wheel, being attached at the central portion thereof to the said primary cable.

The cap screw may include a head and a shank, said neck extending between said head and said shank, said shank having an end protruding outwardly from the compensator, said closing and retaining means being positioned on said end.

The retaining means may include a wire spring formed with double bends having free ends, said shank including bores receiving said free ends, said wire spring acting on said screw as a lever to set said screw in said initial position and formed with a certain degree of reversibility to prevent accidental adjustment and said screw from being released.

Alternatively, the retaining means may include a leaf spring formed with an elongated slot through which said shank passes so as to guide said spring, said shank including a widened end portion at a free end thereof, said spring acting on said widened portion to prevent an accidental release of said screw.

The leaf spring may include projections at opposite sides of said elongated slot and acting to retain the compensator in said adjusted position.

The leaf spring may include end bends facilitating maneuverability of the leaf spring.

The provision of means preventing accidental or involuntary release of the screw is noteworthy in order to provide a real and important improvement in the manufacture of automobiles on the assembly line, allowing a saving in time and effort to be applied in the particular operation to which this invention is applied. To be precise, the particular arrangement of the cap screw advantageously replaces the pins, spring washers or retaining clips currently used for the same purpose and which must be handled with special tools and with movements requiring a greater precision than is required by the object of this invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a plan view of the underside of the brake compensator in an initial assembly position, according to the invention;

FIG. 2 is a top plan view of the brake compensator of FIG. 1;

FIG. 3 is a side view, partially in section, of the brake compensator of FIGS. 1 and 2;

FIG. 4 is a plan view of the underside of the brake compensator according to another embodiment of the invention;

FIG. 5 is a partially sectional side view of the brake compensator of FIG. 4; and FIG. 6 is a top plan view of the brake compensator of yet another embodiment.

DETAILED DESCRIPTION OF THE PREFERRED EMBODIMENTS

Referring now to the drawings in detail, and firstly to FIGS. 1 to 3 it will be seen that the brake compensator according to the invention is comprised of support 40 which includes a substantially tubular body 1 which is closed at one end thereof as designated at 2 and two flat flanges 3 and 3' which are formed as two opposite extensions of tubular body 2. Flanges 3 and 3' are both parallel to the axis of elongation of body 2 and are wider than the tubular body 2. Each flange 3, 3' is formed with a throughbore 4, 4', respectively. Throughbores 4 and 4' receive in snug fit a neck 5 and a shaft 6 of a cap screw 50 which has a head 7.

The handbrake compensator further includes a load distributor element 8 operated to transmit stress applied to a primary cable 13 of the handbrake to and distribute this stress proportionally between two arms of a secondary cable 14, 14'. Two cables in place of two arms of one secondary cable can alternatively operate the braking devices acting on the wheels.

The load distributor element 8 includes two parallel opposing wings 9 and 10 which include therebetween a channel which is partially convex as seen in FIGS. 1 to 5 or straight as in the embodiment of FIG. 6. The tubular portion 1 and flanges 3, 3' extend partially in said channel, as seen from the drawings. Wings 9 and 10 are each provided in the middle portion thereof with an elongated slot 11, 12, respectively to receive the cap screw 50 passing therethrough and extending further through flange 3' as described above.

It is to be understood that the load distributor element 8, both with the curved channel and straight channel (FIG. 6) fulfills its function in the same manner that is it distributes stress applied to the primary cable 13 between the braking devices positioned on the two wheels of the vehicle by means of two portions 14, 14' of either single secondary cable as shown in FIG. 1 or by two secondary cables as is the case of the embodiment of FIG. 6. The terminals of two cables not shown in the embodiment of FIG. 6 are housed in two openings 21, 21'. A two-branch single secondary cable embodiment or two secondary cables are selected depending on the particular features of the automobile model in which the brake compensator is to be installed.

Referring back to FIGS. 1 to 3, it is seen that the neck 5 of the cap screw 50 has a square cross-section and its thickness is substantially equal to the sum of the thickness of flange 3 of support 40 and wing 9 of the load distributor element 8. The shank or shaft 6, i.e., the remainder of cap screw 50 is of a circular cross-section and acts as a retainer and a pivot for a terminal 15 of the primary cable 13. Terminal 15 is suitably guided between wings 9 and 10 of the load distributor element 8. A thrust head or element 18 is positioned in tubular body 1 between spring 17 and the load distributor element 8.

Slot 11 of the load distributor element 8 is provided with toothed edges 16, 16'. The teeth at these edges are of right-angle profile. Thus the opposed edges of neck 5 of the cap screw 50 may snugly fit between each pair of opposing teeth of the edges of slot 11. Throughbore 4 is also of square cross-section and oriented so as to receive neck 5 of screw 50.

Initially the brake compensator is installed in the vehicle in a retracted condition, that is with the load distributor element 8 inserted as far as possible between flanges 3 and 3' of the compensator support, and the spring 17 housed within tubular body 1 is thereby compressed by thrust head 18. This initial position is shown in FIG. 1.

The brake compensator further includes a closing and retaining mechanism 60 which includes a wire spring 19 adapted to act in the direction of arrow F2 (FIG. 3). Wire spring 19 is pivotally mounted on the free portion of shank or shaft 6 of the cap screw 50 and is provided with a double bend 20 which allows this spring to act as a lever facilitating reinsertion of neck 5 between opposing toothed edges 16, 16, of slot 11 of the load distributor element. The geometry of the double bend 20 provides the closing mechanism 60 with a certain degree of irreversability thus ensuring permanence and durability of the adjustment of the brake compensator.

In order to set and adjust the brake compensator once it was mounted in the car, it is sufficient to push the cap screw 50 in the direction shown by arrow F1 in FIG. 3 until the square neck 5 is removed from the slot formed by opposing toothed edges 16, 16' so that spring 17 will be released causing the load distributor element 8 to move outwardly until tension between the primary cable 13 and secondary cable or cables 14, 14' is balanced with a residual force of spring 17. Thereafter the closing mechanism 60, namely its wire spring 19 is operated in the direction of arrow F2 to allow reinsertion of neck 5 between suitable teeth of slot 11 as described above thereby providing a very strong adjustment.

In the embodiment illustrated in FIG. 4 in which for the sake of clarity only one part of the load distributor element 8 is shown, the closing and retaining mechanism 60 comprises a leaf spring 22 seen in FIG. 5 in a side view. Leaf spring 22 is substantially wedge-shaped and includes terminal bends 23 and 24 and an elongated slot 25 extending over a substantial part of the length of leaf spring 22. The shank 6 of cap screw 50 passes through slot 25. The free end 26 of the shank 6 of the cap screw 50 has a widened portion which is greater than the width of slot 25. Thus spring 22 bears against said widened portion so that an accidental release of leaf spring 22 is prevented. Slot 25 is provided at one end thereof with a wider passage 27 to facilitate assembly of the end 26 of the cap screw 50 and the spring 22.

The brake compensator of the embodiment of FIGS. 4 and 5 is adjusted in the following fashion:

Initially the setting and adjustment of the brake compensator, once installed in the automobile, is carried out by pushing the leaf spring 22 in the direction of arrow F3 (FIG. 5) to release the same from the initial tension and allowing release of the cap screw 50 by pushing it in the direction of arrow F1. At this stage of setting of the brake compensator, the spring 22 slides easily guided by the screw 50, the shank 6 of which is inserted in the slot 25. This release is produced when the neck 5, which is provided with the square cross-section, emerges from the position between the toothed edges 16, 16' and the spring 17 becomes slack causing the consequent movement of the load distributor element 8 outwardly until the tension of the primary cable 13 and secondary cables 14, 14' is balanced by residual tension of spring 17. Immediately the spring 22 is pushed in the direction of arrow F4 causing the reinsertion of the neck 5 of screw 50 into slot 11 between two new teeth of edges 16, 16' of the load distributor element 8.

In order to prevent the closing and retaining mechanism 60 from undesired release, that is release of screw 50 from tension of spring 22 by non-intentional or accidental situation such as blows or vibrations caused by driving the motor vehicle over rough surfaces, spring 22 is provided with small projections or protuberances 28, 28' at each side of slot 25, causing an engagement with the widened portion 26 of the screw 50, of sufficient strength to ensure the necessary degree of irreversability required in the established adjustment.

It will be understood that each of the elements described above, or two or more together, may also find a useful application in other types of handbrake compensators differing from the types described above.

While the invention has been illustrated and described as embodied in a handbrake compensator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A handbrake compensator for motor vehicles, comprising support means having an axis of elongation and including a substantially tubular body closed at one end thereof and including at an opposite end two parallel flanges; load distributor means including two superimposed parallel wings positioned between said flanges; spring means accommodated in said tubular body and being maintained in a compressed position against said load distributor means; a cap screw extending through said flanges and said wings; a primary cable having a terminal inserted in said load distributor means; at least one secondary cable connected to said load distributor means, said screw holding said terminal of said primary cable in the handbrake compensator; and closing and retaining means provided on said cap screw, said wings each including an elongated slot through which said cap screw passes, one of said slots having two opposite toothed edges extended along said axis of elongation and adapted to snugly receive a portion of said cap screw, said cap screw being insertable into said one slot in an initial position in which said load distributor means applies against said spring means a predetermined force to compress said spring means, said cap screw being removable from said one slot by pushing said cap screw so as to change a position of said load distributor means along said axis and thus adjust a tension of said primary cable relative to said secondary cable by a residual force of said spring means, said cap screw being reinsertable into said one slot between said toothed edges in a new adjusted position in which said cap screw is retained by said closing and retaining means.

2. The compensator as defined in claim 1, wherein said elongated slots are centrally positioned in said respective wings.

3. The compensator as defined in claim 1, wherein said terminal has an opening through which said cap passes to hold said terminal with an ability to pivot.

4. The compensator as defined in claim 2, wherein said flanges are provided with bores receiving said cap screw, said portion of said cap screw being a neck of a square cross-section, one of said bores having a square cross-section to snugly receive said neck, said neck being also engaged in said adjusted position between flanks of two pairs of consecutive teeth of said toothed edges of said one slot so that in said adjusted position said support means and said load distributor means are firmly held together.

5. The compensator as defined in claim 4, wherein said one of said bores has a diagonal coinciding in direction with said axis of elongation.

6. The compensator as defined in claim 4, wherein said wings of said load distributor means have arc-shaped surfaces, an arc-shaped surface of each wing forming a channel at an inner side.

7. The compensator as defined in claim 4, wherein said load distributor means encloses a straight channel and has a bottom portion formed with two bores which receive ends of secondary cables.

8. The compensator as defined in claim 4, wherein said cap screw includes a head and a shank, said neck extending between said head and said shank, said shank having an end protruding outwardly from the compensator, said closing and retaining means being positioned on said end.

9. The compensator as defined in claim 8, wherein said closing and retaining means includes a wire spring formed with double bends having free ends, said shank including bores receiving said free ends, said wire spring acting on said screw as a lever to set said screw in said initial position and formed with a certain degree of reversibility to prevent accidental adjustment and said screw from being released.

10. The compensator as defined in claim 8, wherein said closing and retaining means includes a leaf spring formed with an elongated slot through which said shank passes so as to guide said spring, said shank including a widened end portion at a free end thereof, said spring acting on said widened portion to prevent an accidental release of said screw.

11. The compensator as defined in claim 10, wherein said leaf spring includes projections at opposite sides of said elongated slot and acting to retain the compensator in said adjusted position.

12. The compensator as defined in claim 11, wherein said leaf spring includes end bends facilitating maneuverability of the leaf spring.

* * * * *